United States Patent [19]
Lester

[11] Patent Number: 6,157,305
[45] Date of Patent: Dec. 5, 2000

[54] CROP FROST PREDICTION SYSTEM

[75] Inventor: Theodore V. Lester, Schiller Park, Ill.

[73] Assignee: Motorola, Inc., Schaumburg, Ill.

[21] Appl. No.: 09/388,492

[22] Filed: Sep. 2, 1999

[51] Int. Cl.[7] .................................................. G01W 1/00
[52] U.S. Cl. ...................... 340/601; 340/587; 340/870.17
[58] Field of Search ........................ 340/870.17, 870.18,
340/870.19, 870.2, 870.21, 870.22, 870.23,
870.29, 600, 601, 602, 584, 586, 588, 589,
678, 691.1, 692.2, 692.3, 692.4, 692.5,
692.6

[56] References Cited

U.S. PATENT DOCUMENTS

| | | | |
|---|---|---|---|
| 4,483,631 | 11/1984 | Kydd ........................................ | 374/141 |
| 4,601,842 | 7/1986 | Caple et al. ............................... | 252/70 |
| 5,000,579 | 3/1991 | Kumada et al. ........................... | 374/28 |
| 5,038,852 | 8/1991 | Johnson et al. ........................... | 165/12 |
| 5,272,879 | 12/1993 | Wiggs ....................................... | 60/676 |
| 5,295,625 | 3/1994 | Redford ................................. | 239/14.1 |
| 5,763,858 | 6/1998 | Jones ...................................... | 218/506 |
| 5,809,789 | 9/1998 | Baker et al. ............................... | 62/81 |
| 5,927,603 | 7/1999 | McNabb .................................... | 239/63 |

*Primary Examiner*—Benjamin C. Lee
*Assistant Examiner*—Daniel Previl
*Attorney, Agent, or Firm*—Simon Anolick

[57] ABSTRACT

A crop frost prediction system (20) is provided. The system (20) exposes a thermally radiant surface (22) to atmosphere (26) and senses the temperature of the thermally radiant surface (22). The sensed temperation, alone or in combination with other variables, is used by a processor (38) to calculate whether frost is likely to occur. The system (20) capitalizes on the understanding of the inventor that the thermally radiant surface (22) will dissipate heat (24), and thus have a lower temperature than the ambient air, under conditions of low humidity and clear night sky.

6 Claims, 3 Drawing Sheets

CROP FROST PREDICTION SYSTEM

FIELD OF THE INVENTION

The present invention generally relates to meteorology, and, more particularly, relates to apparatus and methods for predicting impending frost.

BACKGROUND OF THE INVENTION

Under conditions of low humidity, low nighttime temperatures, and little or no cloud cover, heat from exposed earth, plants, and the like can quickly radiate skyward. Conversely, when such elements are covered by way of man-made housings or meteorological coverings, e.g., water vapor in the form of high humidity or cloud cover, the heat from the earth and plants is not able to radiate skyward, but rather is dissipated into the ambient air and trapped. The ambient air temperature thus remains relatively high and in turn maintains relatively high surface temperatures in the earth and plants as well.

Analyzing this phenomenon in deeper detail, the microclimate of a typical plant leaf needs to be considered. Such plant leaves have a given temperature based on a number of parameters, including ambient air temperature, earth temperature, plant cycle activity, wind speed, etc. As with any object, if the temperature of the plant leaf is greater than the temperature of the ambient air surrounding the leaf, heat will be radiated and dissipated from the leaf to the ambient air. The leaf will become colder than the air ambient temperature due to a lack of heat exchange from convection. Only the air in direct contact with the leaf is near the leaf temperature.

If the above-referenced conditions of low humidity, ambient air temperature and cloud cover are present, the water vapor will radiate skyward and the heat from the plant will dissipate at a sufficiently high rate that the surface temperature of the leaf reduces in temperature faster than the ambient air temperature. If the surface temperature of the leaf drops below the freezing point of water, microscopic water droplets on the leaf will crystalize into ice, resulting in the well-known condition of frost.

Frost is a damaging condition which agriculturalists fervently attempt to avoid. The crystalline ice structure of frost creates a barrier over the plant leaves, preventing the intake of carbon dioxide, and the release of oxygen which are essential steps for sustaining plant life. If the frost occurs before harvest, crop yields can be diminished, if not completely lost.

Various mechanisms are therefore employed for preventing frost formation. For example, with small-scale gardens, homeowners often cover their plants with plastic or paper shrouds to capture radiant heat if the overnight weather forecast is for relatively low temperatures. Larger facilities such as nurseries, often maintain operations within large glass greenhouses, at least in part, for the same reason. Still larger operations such as farms and vineyards often employ fans at ground level to circulate the ambient air in immediate contact with the ground. This air is slightly warmer, due to the warmth of the earth, and can be used to elevate the temperature of the plants.

Given the economic and productivity impact of frost damage on crops, as well as the cost associated with the aforementioned frost prevention mechanisms, improved apparatus and methods for predicting the onset of frost could be advantageously employed in improving crop yield while reducing cost at the same time.

Thus, there is a need for a method and apparatus for predicting with greater reliability the likelihood of an impending frost, and for taking measures to guard against frost damage.

Figure 1:
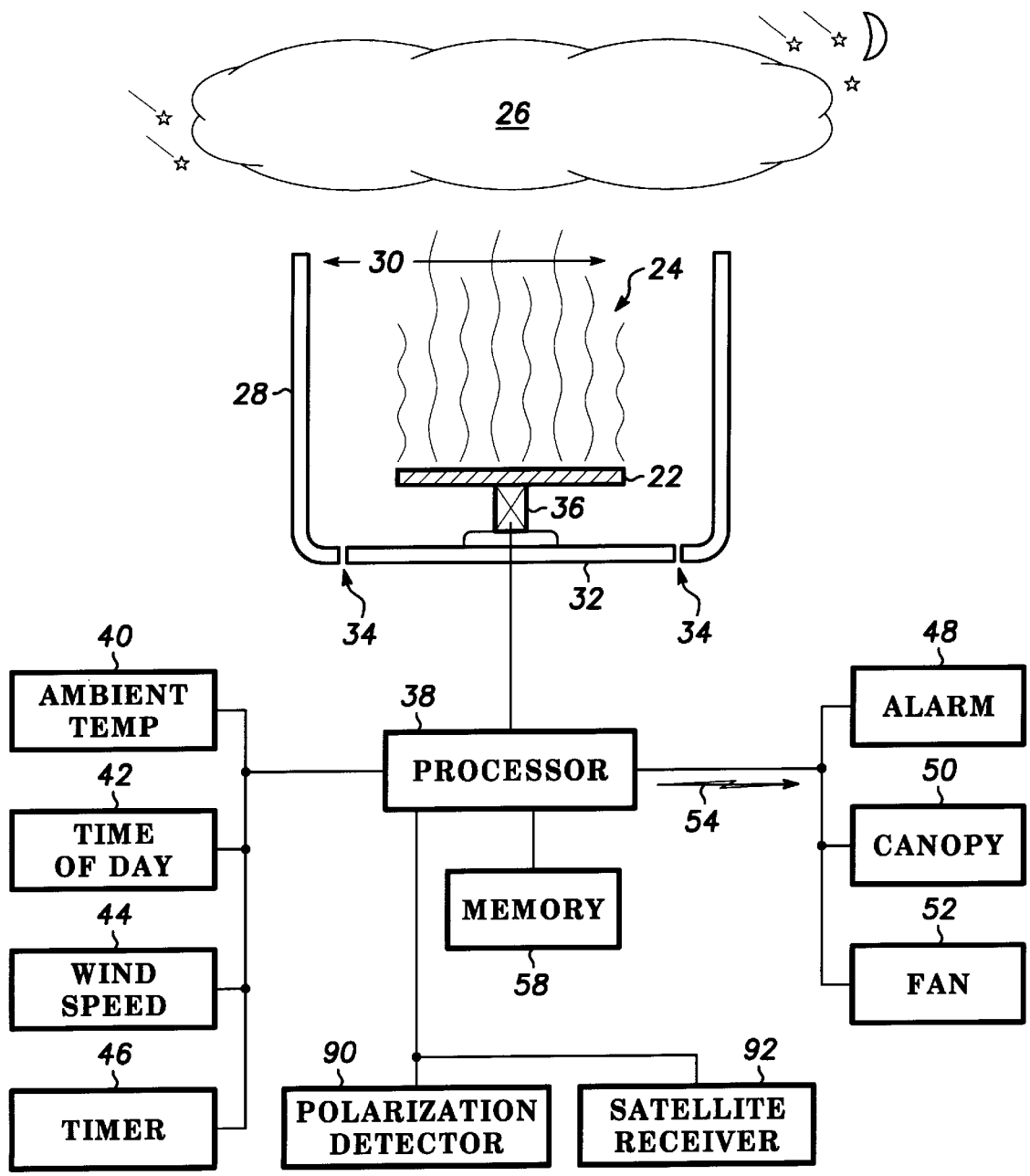
FIG. 1 is a block diagram of a preferred embodiment of the present invention.

While the invention is susceptible to various modifications and alternative constructions, certain illustrative embodiments thereof have been shown in the drawings and will be described below in detail. It should be understood, however, that there is no intention to limit the invention to the specific forms disclosed, but on the contrary, the invention is to cover all modifications, alternative constructions, and equivalents falling within the spirit and scope of the invention as defined by the appended claims.

DETAILED DESCRIPTION OF THE PREFERRED EMBODIMENTS

Referring now to the drawings and with specific reference to FIG. 1, a preferred embodiment of the crop frost prediction system is generally depicted by reference numeral 20. The system 20 provides an improved apparatus and method for predicting the onset of frost by, among other things, capitalizing on the understanding of the inventor that a radiant surface exposed to a clear sky will dissipate heat and reduce in temperature faster than the ambient air surrounding the radiant surface.

As an example, it will be readily understood that if an automobile is parked such that the front of the vehicle is within a garage or similar overhang, and the rear of the vehicle is outside the garage or overhang and thus exposed to the night sky, the heat from the rear of the vehicle will be readily dissipated to the night sky, whereas heat from the front of the vehicle will also be radiated, but such radiated heat will be blocked from dissipation to the night sky by the overhang. The air in immediate contact with the vehicle surface will thus be warmed and maintain the temperature of the front of the vehicle at a higher level as well. As such, the rear of the vehicle will drop in temperature faster than the front of the vehicle, and frost will thus sooner form on the rear window of the vehicle than on the windshield.

The same can be said of other radiant surfaces, such as plant leaves. The present invention therefore provides a radiant surface 22 which attempts to replicate the radiant characteristics of such a plant leaf. For example, the radiant surface 22 can be any suitable thermally conductive material, such as a metal like aluminum. As shown in FIG. 1, the radiant surface 22 is positioned to have a direct pathway of radiant heat 24 between the radiant surface 22 and the night sky or atmosphere 26. To isolate the radiant surface 22, and thus avoid influences thereon based on direct contact with sunlight, the radiant surface 22 is preferably provided within a housing 28 having an open top 30. The housing 28 may include a base 32 with suitable apertures 34 to facilitate drainage. The housing 28 may include an infra-red transparent window (not shown), and the housing may create a partial vacuum for the radiant surface 22, to enhance isolation and detector sensitivity.

A temperature sensor 36, such as a thermocouple or the like, is directly connected to the radiant surface 22 to sense the temperature of the radiant surface 22. The temperature sensor 36 is in turn connected to a processor 38 of the system 20.

A number of other inputs are also connected to the processor 38 including an ambient temperature sensor 40, such as a thermometer, a time of day clock 42, an ambient air or wind speed sensor 44, and a timer 46. To complete the recitation of hardware depicted in FIG. 1, it can be seen that a number of outputs may be connected to the processor 38 including an alarm 48, a canopy 50, and a circulation fan 52, the structure and function of all of which will be discussed in further detail herein.

Using the aforementioned hardware, the system 20 generates a crop frost warning signal 54 based in some manner on the temperature signal received from the radiant surface temperature sensor 36. A number of calculations or algorithms can be employed for generating the warning signal 54, with three such systems being depicted in FIGS. 2-4. However, it is to be understood that each of the systems capitalizes on the understanding of the inventor that the temperature of the radiant surface 22 will more quickly decrease than the temperature of the ambient air under conditions of direct exposure to a clear night sky 26, along with low ambient humidity.

Figure 2:
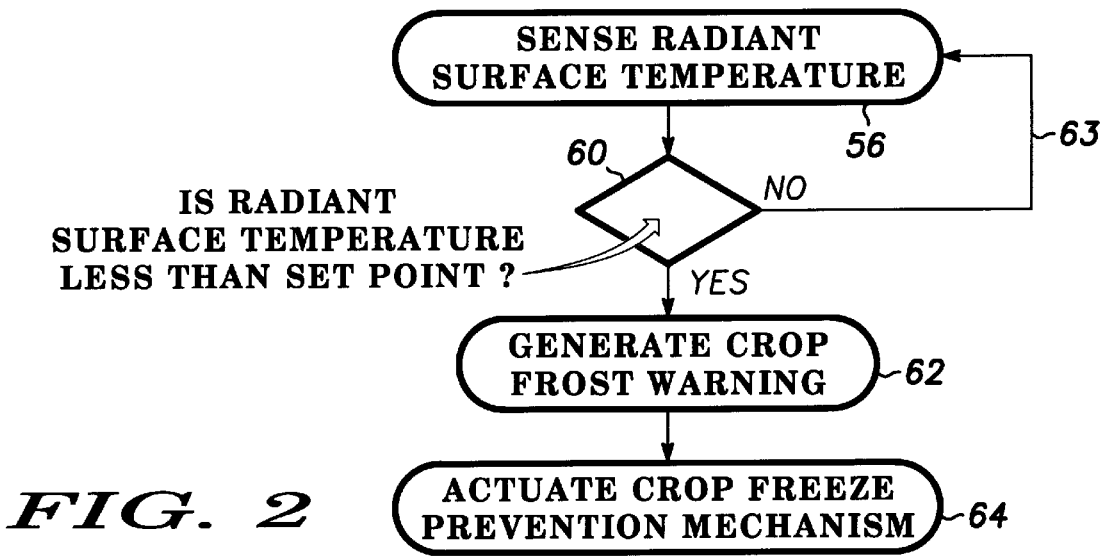
FIG. 2 is a flow chart depicting a sequence of steps performed by the invention according to a first embodiment.

Turning now to FIG. 2, one system for calculating the crop frost warning signal 54 is depicted. As shown therein, the temperature of the radiant surface 22 is sensed as indicated by step 56. A signal related to this temperature is communicated to the processor 38 which compares the radiant surface temperature, $T_r$, to a predetermined set point stored in a memory 58 connected to the processor 38. This step is depicted by reference numeral 60 in FIG. 2. If $T_r$ is less than the predetermined set point, the crop frost warning signal 54 is generated by the processor 38 as indicated by step 62. Alternatively, if $T_r$ is greater than the predetermined set point, the system 20 continues to cycle by returning to step 56 as indicated by arrow 63.

FIG. 2 also depicts a step 64 which calls for a crop frost prevention mechanism to be actuated after the crop frost warning signal 54 is generated. The actuation step 64 can take a number of forms, including the three depicted in FIG. 1 as the alarm 48, the canopy 50, and the circulation fan 52. More specifically, the crop frost warning signal 54 can be communicated to the circulation fan 52 to cause its actuation and thus circulation of ambient air in the vicinity of the crop. Alternatively, the insulating canopy 50 can be moved from a stowed position to a deployed position upon receipt of the crop frost warning 54. The insulating canopy 50 is positioned directly over the crop when deployed to thus retain the heat radiated by the crop in the vicinity of the crop and not allow the heat to be dissipated to the atmosphere 26. With regard to the alarm 48, it can be provided in a number of forms including audio alarms, visual alarms, and tactile alarms which would be sensorily perceived by a system operator, who in turn would manually perform an act for preventing crop frost formation, such as manually activating a circulation fan or manually covering the crop.

Figure 3:
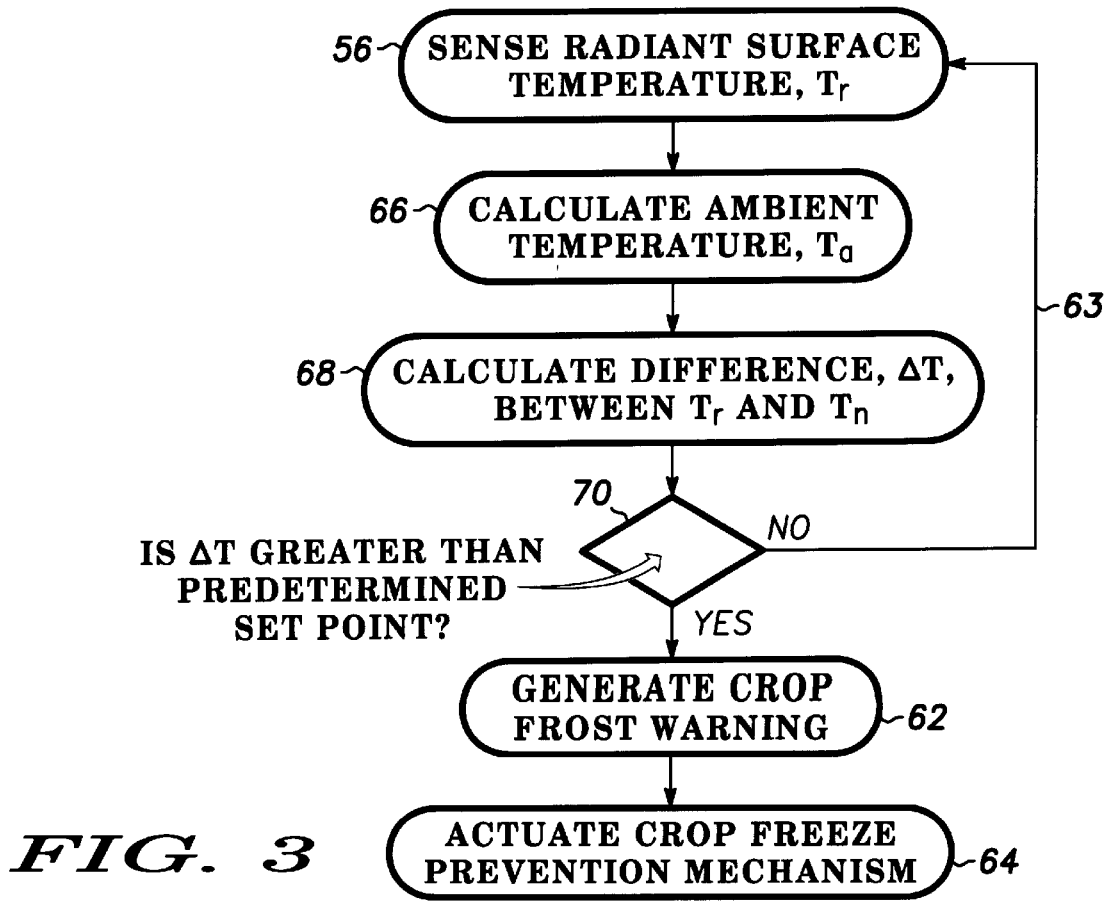
FIG. 3 is a flow chart depicting a sequence of steps performed by the invention according to a second embodiment.

In a second embodiment, depicted in FIG. 3, steps 56, 62 and 64 remain the same, but alternative calculations are performed therebetween. More specifically, as shown in FIG. 3, in addition to sensing $T_r$ as indicated by step 56, a step 66 is performed wherein the ambient temperature sensor 40 is utilized to sense the ambient air temperature, $T_a$. The processor 38 then calculates the difference, $\Delta T$, between $T_r$ and $T_a$. This is indicated as step 68 in FIG. 3. The processor 38 then compares the $\Delta T$ to a predetermined set point stored in the memory 58 as indicated by step 70. If the $\Delta T$ is greater than the predetermined set point, the warning signal 54 is generated as indicated by step 62, whereas if the $\Delta T$ is less than the predetermined set point, the system repeats as indicated by arrow 63.

In the third embodiment depicted in FIG. 4, it can again be seen that steps 56, 62 and 64 are performed, but with still different calculations therebetween. More specifically, in addition to sensing $T_r$ as indicated by step 56, the timer 46 is utilized in step 74 to determine the elapsed time between measurements. This information is in turn used by the processor 38 to calculate a rate of change between $T_r$ at a first time instance and a second time instance, as indicated by step 76.

The clock 42 is utilized to determine the time of day, and thus the number of hours between current time and sunrise, when ambient temperatures accordingly increase. This step is indicated by reference numeral 78. Based on the $T_r$, the elapsed time, and the time of day, the processor 38 can then extrapolate the decrease in temperature over time to determine if, prior to sunrise, the $T_r$ will drop below the freezing point of water. Such calculations are indicated by steps 80 and 82, respectively. If the processor 38 determines that the $T_r$ will likely fall below the freezing point of water, the crop frost warning signal 54 as generated is indicated by step 62, whereas if the calculation proves negative, the system 20 recycles as indicated by arrow 63.

Figure 4:
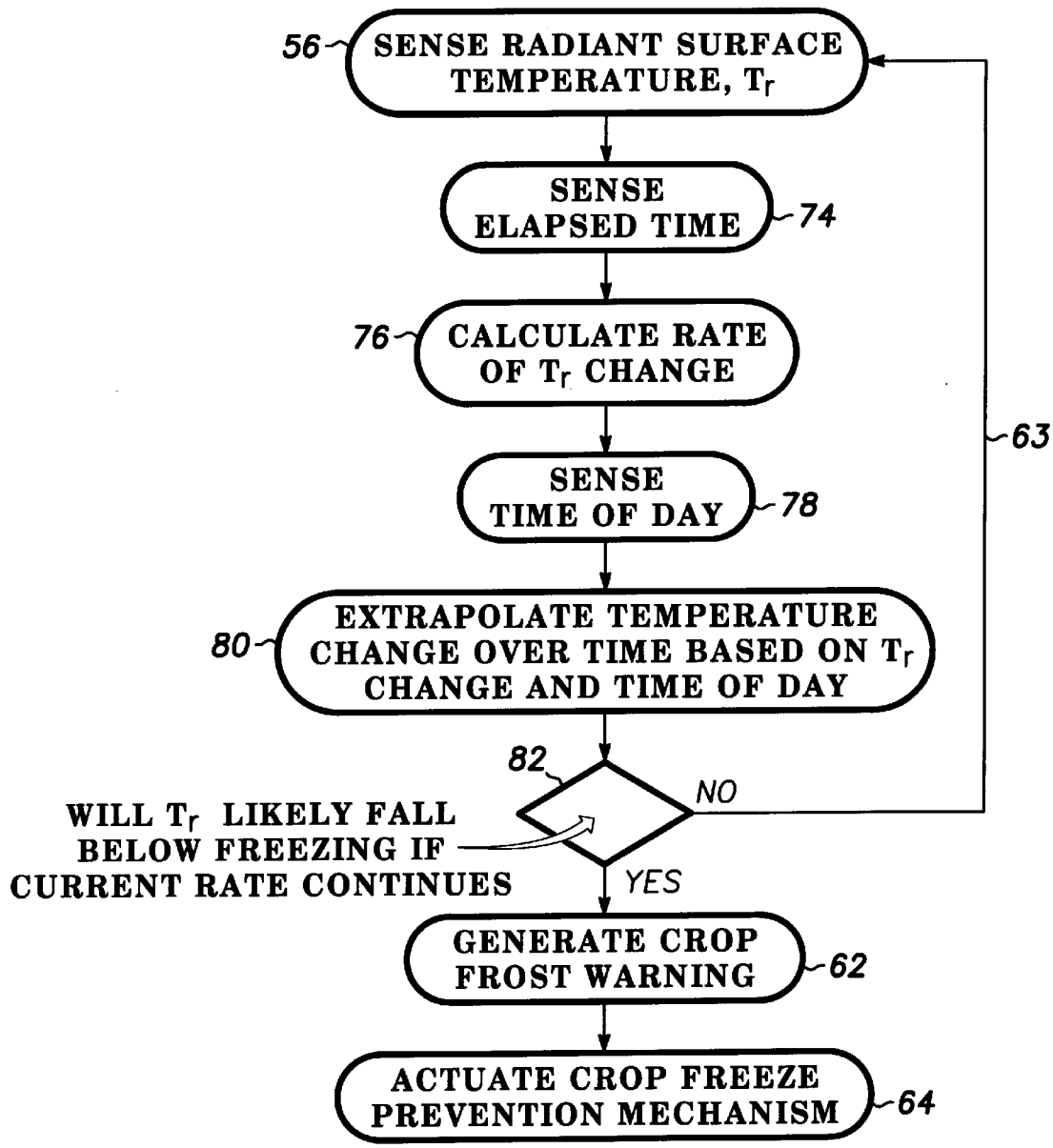
FIG. 4 is a flow chart depicting a sequence of steps performed by the invention according to a third embodiment.

It should be noted that the three sets of calculations depicted in FIGS. 2-4 serve as only three examples capitalizing on the present invention, and that other variables and other calculations are possible. For example, the wind speed sensor 44 can be utilized to communicate a wind speed signal to the processor 38, which in turn can be used, for example, to calculate an air motion factor for use in its subsequent calculations with regard to the crop frost warning signal 54. In addition, a polarization detector 90 consisting of a pair of photocells with polarizers, one at ninety degrees to the other, can be used to detect north light polarization during daytime hours. Since this is an indication that no cloud cover exists, such a detector could be used in predicting frost. A still further possibility would capitalize on the understanding of the inventor that water vapor experiences significant signal loss at a particular frequency, i.e. 23 gigahertz (KA band). The varying strength of signals between satellites operating at that frequency and a ground receiving station could also be used by a satellite receiver 92 to gauge the amount of water vapor in the ambient air, and thus provide another indicator for predicting frost.

From the foregoing, it can therefore be seen that the present invention provides an improved crop frost warning system which provides a user of the system with advanced warning as to an impending frost. In so doing, corrective action can be undertaken either automatically or manually to prevent or minimize crop frost damages.

Many additional changes and modifications could be made to the invention without departing form the fair scope and spirit thereof. The scope of some changes is discussed above. The scope of others will become apparent from the appended claims.

What is claimed is:

1. A crop frost prediction system, comprising:

a thermally radiant surface positioned in ambient air;

a temperature sensor connected to the thermally radiant surface and generating a signal related to the temperature of the thermally radiant surface;

a processor connected to the temperature sensor, the processor generating a crop frost warning depending on the signal from the temperature sensor; and a wind speed sensor generating a signal proportional to ambient air speed, the signal proportional to ambient air speed being utilized by the processor in generating a crop frost warning.

2. A method of predicting crop frost, comprising the steps of:

positioning a thermally radiant surface in ambient air;

sensing a temperature of the thermally radiant surface at discrete time intervals;

sensing ambient air speed;

calculating a rate of temperature change; and generating a crop frost warning depending on the temperature of the thermally radiant surface, the ambient air speed, and whether the rate of temperature change exceeds a predetermined set point.

3. A crop frost prediction system, comprising:

a housing having an open top;

a thermally radiant surface positioned within the housing;

a temperature sensor connected to the thermally radiant surface and adapted to generate a signal related to the temperature of the thermally radiant surface;

an ambient air temperature sensor adapted to generate a signal related to ambient air temperature;

an ambient air speed sensor adapted to generate a signal related to ambient air speed;

a clock adapted to generate a signal related to a time of day;

a timer adapted to generate a signal related to elapsed time;

a processor receiving the signals related to the temperature of the thermally radiant surface, the ambient air temperature, the ambient air speed, the time of day and the elapsed time, the processor generating a crop frost warning based on the signals related to the temperature of the thermally radiant surface, the ambient air temperature, the ambient air speed, the time of day and the elapsed time.

4. The crop frost prediction system of claim 3 further including a fan connected to the processor, the fan being actuated when the processor generates a crop frost warning.

5. The crop frost prediction system of claim 3 further including an insulation canopy operable between a deployed position covering a field, and a stowed position not covering the field, the insulating canopy being moved to the deployed position when the processor generates a crop frost warning.

6. The crop frost prediction system of claim 3 further including a sensorily perceptible alarm connected to the processor, the alarm being actuated when the processor generates a crop frost warning.

* * * * *